(12) United States Patent
Jing

(10) Patent No.: US 11,789,929 B2
(45) Date of Patent: Oct. 17, 2023

(54) METHOD, APPARATUS, DEVICE AND MEDIUM FOR PERFORMING REVIEW BASED ON BLOCKCHAIN

(71) Applicant: Baidu Online Network Technology (Beijing) Co., Ltd., Beijing (CN)

(72) Inventor: Bo Jing, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 220 days.

(21) Appl. No.: 17/153,920

(22) Filed: Jan. 21, 2021

(65) Prior Publication Data

US 2021/0224249 A1 Jul. 22, 2021

(30) Foreign Application Priority Data

Jan. 21, 2020 (CN) .......................... 202010071991.8

(51) Int. Cl.
*G06F 16/23* (2019.01)
*G06F 16/27* (2019.01)

(52) U.S. Cl.
CPC .......... *G06F 16/2365* (2019.01); *G06F 16/27* (2019.01)

(58) Field of Classification Search
CPC ... G06F 16/2365; G06F 16/27; G06Q 30/018; G06Q 10/103; G06Q 50/205; G06Q 10/10; H04L 9/3236; H04L 9/50; H04L 63/0421
USPC ........................................................ 707/703
See application file for complete search history.

(56) References Cited

U.S. PATENT DOCUMENTS

2018/0301051 A1 10/2018 Masaaki
2019/0066119 A1 2/2019 Sengupta

FOREIGN PATENT DOCUMENTS

WO 2017090329 A1 6/2017

OTHER PUBLICATIONS

Chun-I Fan et al.; "Truly Anonymous Paper Submission and Review Scheme"; International Conference on Availability, Reliability and Security, 2009; Ares '09; IEEE, Piscataway, New Jersey, U.S.; Mar. 16, 1999, pp. 960-965; XP031469318; ISBN: 978-1-4244-3572-2 (6 pages).
Extended European Search Report for Application No. 21152839.3, dated Jun. 1, 2021 (8 pages).
Chun-I Fan et al.; "Truly Anonymous Paper Submission and Review Scheme"; 2009 International Conference on Availability, Reliability and Security, 2009, pp. 960-965; DOI: 10.1109/ARES.2009.30 (8 pages).

*Primary Examiner* — Michael Pham
(74) *Attorney, Agent, or Firm* — Ice Miller LLP

(57) ABSTRACT

A method, an apparatus, a device and a medium for performing a review based on a blockchain are provided. When performed by a reviewing party, the method includes: determining a review conclusion and anonymous identity data of the reviewing party, in response to a review request of a to-be-reviewed party acquired from a review organization party; and generating a chaining transaction request including the review conclusion and the anonymous identity data, to write the review conclusion and the anonymous identity data into a blockchain.

11 Claims, 6 Drawing Sheets

METHOD, APPARATUS, DEVICE AND MEDIUM FOR PERFORMING REVIEW BASED ON BLOCKCHAIN

CROSS-REFERENCE TO RELATED APPLICATIONS

This application claims the priority of Chinese Patent Application No. 202010071991.8, titled "METHOD, APPARATUS, DEVICE AND MEDIUM FOR PERFORMING REVIEW BASED ON BLOCKCHAIN," filed on Jan. 21, 2020, the content of which is incorporated herein by reference in its entirety.

TECHNICAL FIELD

Embodiments of the present disclosure relate to the field of computer technology, and specifically to the blockchain technology.

BACKGROUND

At present, review falsification news appear frequently, and a falsification is mainly related to a serious review loophole existing in a review process. Accordingly, the public has a serious doubt about the truth of the review process.

Taking a review on a paper as an example, an existing paper review process is generally to publish a review teacher first. After the teacher completes the review, a student may appeal to the review teacher for a review conclusion. There is a phenomenon of modifying the review conclusion, which affects the accuracy of the review conclusion. Moreover, the review conclusion is usually stored in a database. After the review, another person may also falsify the review by modifying the review conclusion in the database.

SUMMARY

Embodiments of the present disclosure disclose a method, an apparatus, an electronic device and a medium for performing a review based on a blockchain, to avoid tampering of a review conclusion, thus improving the security and public credibility of a review process.

In a first aspect, a method for performing a review based on a blockchain, performed by a reviewing party, is provided according to embodiments of the disclosure, the method including:

determining a review conclusion and anonymous identity data of the reviewing party, in response to a review request of a to-be-reviewed party acquired from a review organization party; and generating a chaining transaction request including the review conclusion and the anonymous identity data, to write the review conclusion and the anonymous identity data into the blockchain.

Alternatively, after generating the chaining transaction request including the review conclusion and the anonymous identity data, the method further includes:

generating an identity information publication transaction request after a review end event is detected by monitoring; and sending the identity information publication transaction request to a blockchain network, to instruct the blockchain network to perform a verification on the anonymous identity data, and writing public identity information of the reviewing party into the blockchain if the verification is passed.

Alternatively, the determining a review conclusion and anonymous identity data of the reviewing party includes:

determining the review conclusion;
generating a secret character string;
determining hash data of the secret character string as the anonymous identity data.

Alternatively, the generating an identity information publication transaction request includes:

generating an identity information publication transaction request including the secret character string, for instructing the blockchain network to perform a verification on the hash data according to the secret character string; and writing the public identity information of the reviewing party into the blockchain if the verification is passed.

Alternatively, the generating a chaining transaction request including the review conclusion and the anonymous identity data includes:

performing, based on a signature algorithm, a signature on the review conclusion using a local key to obtain signature data;

generating the chaining transaction request including the review conclusion, the anonymous identity data and the signature data, the signature data being used to determine whether the reviewing party belongs to a candidate reviewing party set.

In a second aspect, a method for performing a review based on a blockchain, performed by a review organization party, is provided, the method including:

acquiring a target reviewing party selected from a candidate reviewing party set, in response to a review request sent by a to-be-reviewed part; and sending the review request to the target reviewing party to instruct the target reviewing party to determine a review conclusion and anonymous identity data of the reviewing party, and generating a chaining transaction request including the review conclusion and the anonymous identity data to write the review conclusion and the anonymous identity data into the blockchain.

Alternatively, the chaining transaction request further includes signature data obtained by performing a signature on the review conclusion;

correspondingly, after the sending the review request to the target reviewing party, the method further includes:

determining whether the target reviewing party belongs to the candidate reviewing party set according to the signature data; and if the target reviewing party belongs to the candidate reviewing party set, sending review valid notification information to a blockchain network, for instructing the blockchain network to write the review conclusion and the anonymous identity data into the blockchain.

In a third aspect, a method for performing a review based on a blockchain, performed by a block generation node in a blockchain network, is provided, the method including:

receiving a chaining transaction request including a review conclusion and anonymous identity data of a reviewing party and being sent by a reviewing party; and writing the review conclusion and the anonymous identity data into the blockchain.

Alternatively, after writing the review conclusion and the anonymous identity data into the blockchain, the method further includes:

performing a verification on the anonymous identity data in response to an identity information publication transaction request sent by the reviewing party; and writing public identity information of the reviewing party into the blockchain if the verification is passed.

Alternatively, the anonymous identity data is hash data of a secret character string.

Alternatively, the performing a verification on the anonymous identity data in response to an identity information publication transaction request sent by the reviewing party includes:

performing a verification on the hash data according to the secret character string, in response to an identity information publication transaction request including the secret character string and being sent by the reviewing party.

Alternatively, the chaining transaction request further includes signature data obtained by performing a signature on the review conclusion;

correspondingly, the writing the review conclusion and the anonymous identity data into the blockchain includes:

controlling a review organization party to determine whether the target reviewing party belongs to a candidate reviewing party set according to the signature data;

if review valid notification information sent by the review organization party is received, writing the review conclusion and the anonymous identity data into the blockchain.

In a fourth aspect, an apparatus for performing a review based on a blockchain, configured in a reviewing party, the apparatus including:

a review data determining module, configured to determine a review conclusion and anonymous identity data of the reviewing party, in response to a review request of a to-be-reviewed party acquired from a review organization party; and a chaining request generating module, configured to generate a chaining transaction request including the review conclusion and the anonymous identity data, to write the review conclusion and the anonymous identity data into the blockchain.

In a fifth aspect, an apparatus for performing a review based on a blockchain, configured in a review organization party, is provided, the apparatus including:

a reviewing party determining module, configured to acquire a target reviewing party selected from a candidate reviewing party set, in response to a review request sent by a to-be-reviewed party; and a review request sending module, configured to send the review request to the target reviewing party to instruct the target reviewing party to determine a review conclusion and anonymous identity data of the reviewing party; and generate a chaining transaction request including the review conclusion and the anonymous identity data to write the review conclusion and the anonymous identity data into the blockchain.

In a sixth aspect, an apparatus for performing a review based on a blockchain, configured in a block generation node in a blockchain network, is provided, the apparatus including:

a chaining request receiving module, configured to receive a chaining transaction request including a review conclusion and anonymous identity data of a reviewing party and being sent by the reviewing party; and a data chaining module, configured to write the review conclusion and the anonymous identity data into the blockchain.

In a seventh aspect, an electronic device is provided, the electronic device including:

at least one processor; and a storage device, communicated with the at least one processor, where the storage device stores an instruction executable by the at least one processor, and the instruction is executed by the at least one processor, to enable the at least one processor to perform the method for performing a review based on a blockchain according to any embodiment of the disclosure.

In an eighth aspect, a non-transitory computer readable storage medium, storing a computer instruction, is provided, where the computer instruction is used to cause a computer to perform the method for performing a review based on a blockchain according to any embodiment of the disclosure.

BRIEF DESCRIPTION OF THE DRAWINGS

Accompanying drawings are used for a better understanding of the scheme, and do not constitute a limitation to the present disclosure. In the drawing.

DETAILED DESCRIPTION OF EMBODIMENTS

Example embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

Before embodiments of the present disclosure are described, a brief description is first performed for a participating party performing a method for performing a review based on a blockchain in the present disclosure. Specifically, the participating party performing the method for performing a review based on a blockchain includes a to-be-reviewed party, a review organization party, a reviewing party, and a block generation node in a blockchain network.

Here, the to-be-reviewed party may be a party having a review demand. For example, if the review is a paper review, the to-be-reviewed party may be a student writing a paper. The review organization party may be a party receiving the review request of the to-be-reviewed party and organizing this review process. For example, if the review is the paper review, the review organization party may be the educational administration department of a school. The reviewing party may be a party specifically performing the review operation. For example, if the review is the paper review, the reviewing party may be a teacher of the school. Alternatively, in general, a number of reviewing parties may be more than one, and a plurality of reviewing parties may be regarded as a candidate reviewing party set. A reviewing party (i.e., a target reviewing party) performing a certain review operation may be selected by the review organization party from the candidate reviewing party set according to an actual review demand. Alternatively, a device side corresponding to the to-be-reviewed party, the review organization party and the reviewing party may be a blockchain node device or may not be a blockchain node, but may interact with a blockchain node device through an interface provided by the blockchain node device to participate the blockchain network, which is not limited in embodiments.

First Embodiment

Figure 1:
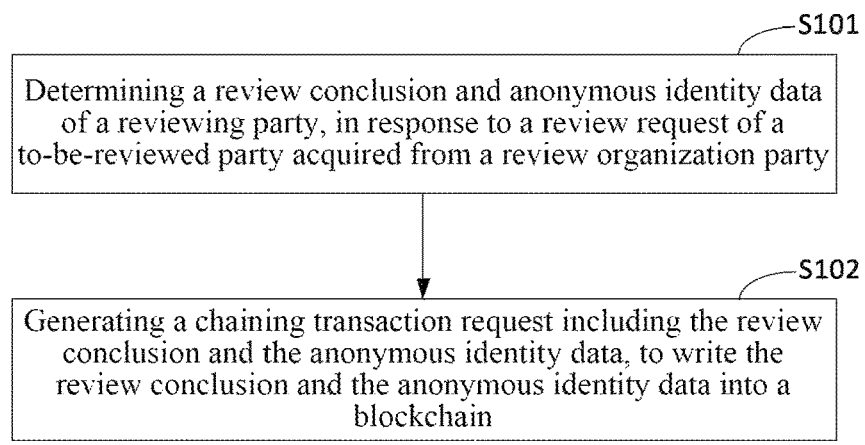
FIG. 1 is a flowchart of a method for performing a review based on a blockchain provided according to a first embodiment of the present disclosure.

FIG. 1 is a flowchart of a method for performing a review based on a blockchain provided according to a first embodiment of the present disclosure. This embodiment is applicable to a situation where a review is performed on relevant content based on a blockchain. For example, the review may be a review performed on the quality of a paper based on a blockchain. Next, the embodiment of the present disclosure is described by taking the review on the quality of the paper as an example, but is not limited to the review only performed on the quality of the paper, and may also include a review performed on other contents, for example, a review performed on a competency and qualification and a review performed on a job admission. The method may be performed by the reviewing party. Specifically, the method may be performed by an apparatus for performing a review based on a blockchain, the apparatus being integrated in a device of the reviewing party. The apparatus may be implemented by means of software and/or hardware. As shown in FIG. 1, the method for performing a review based on a blockchain provided in this embodiment may include steps S101 to S102.

S101 includes determining a review conclusion and anonymous identity data of a reviewing party, in response to a review request of a to-be-reviewed party acquired from a review organization party.

Here, the anonymous identity data of the reviewing party may refer to data used to prove the identity of the reviewing party under the premise that the true identity information of the reviewing party is not disclosed. Alternatively, the anonymous identity data may be a group of character string data, or may be data obtained by processing the group of character string data according to a certain rule, which is not limited in this embodiment.

Alternatively, in the embodiment of the present disclosure, when having a review demand, the to-be-reviewed party sends, through a terminal device thereof or an application program client providing a review service, the review request to the review organization party.

Alternatively, the review request may include to-be-reviewed content, a review requirement, and the like. After receiving the review request sent by the to-be-reviewed party, the review organization party may transmit the review request to target reviewing party which will perform the review. Alternatively, the review organization party may analyze the review request, select at least one reviewing party (i.e., the target reviewing party) performing the review operation from a candidate reviewing party set available for selection, and transmit the received review request to each target reviewing party. In response to the acquired review request, each target reviewing party receiving the target review request performs a review on the to-be-reviewed content in the review request, to obtain a review conclusion. For example, the review conclusion may refer to that the review is passed or not passed, or may refer to a review score or a review comment. After obtaining the review conclusion, the reviewing party also needs to generate anonymous identity data representing its identity. Alternatively, the reviewing party may generate a group of character strings as the anonymous identity data thereof; encrypt the group of the generated character strings using a preset encryption algorithm (e.g., a hash encryption, a secret-key signature or a symmetric encryption) and use the encrypted result as the anonymous identity data; or determine, in other ways, the anonymous identity data of the reviewing party, which is not limited in this embodiment.

For example, when having a paper review demand, a student, as a to-be-reviewed party, may send a paper review request to the educational administration department of a school, as a review organization party, through a terminal of the student or an application program client providing a review service. The educational administration department of the school determines a review teacher performing the review as the target reviewing party according to the to-be-reviewed paper, and sends the review request to the review teacher. The review teacher performs a review on the paper in the review request to obtain a review conclusion. In order to keep the true identity of the review teacher confidential, the anonymous identity data of the review teacher is generated.

S102 includes generating a chaining transaction request including the review conclusion and the anonymous identity data, to write the review conclusion and the anonymous identity data into the blockchain.

Alternatively, after determining the review conclusion and the anonymous identity data, the reviewing party may invoke a smart contract to initiate the chaining transaction request including the review conclusion and the anonymous identity data, and send the chaining transaction request to the blockchain network, such that a block generation node in the blockchain network writes the review conclusion and the anonymous identity data that are included in the chaining transaction request into the blockchain, in response to the chaining transaction request.

Alternatively, in order to ensure the accuracy of the review conclusion and the anonymous identity data that are written into the blockchain, in the embodiment of the present disclosure, a verification may be performed on the received chaining transaction request, and a chaining operation may be performed on the review conclusion and the anonymous identity data after the verification is passed. Alternatively, when the chaining transaction request is verified, the verification may refer to a verification performed on the accuracy of the content (e.g., the review conclusion) included in the chaining transaction request, or a verification performed on the identity of the reviewing party sending the chaining transaction request. It should be noted that how the block generation node specifically performs the verification on the identity of the reviewing party will be described in detail in subsequent embodiments.

For example, after determining the review conclusion of the to-be-reviewed paper and the anonymous identity data of the review teacher through S101, the review teacher may invoke the smart contract to initiate the chaining transaction request including the review conclusion and the anonymous identity data, and send the chaining transaction request to the blockchain network, to request the blockchain network to chain and store the review conclusion and the anonymous identity data. The student, as the to-be-reviewed party, may query the review conclusion of the paper through the blockchain network. However, since the student does not know the true identity of the reviewing party, the student cannot appeal to the review teacher, and thus does not affect the review conclusion of the review teacher for the paper.

According to the technical solution provided in the embodiment of the present disclosure, the reviewing party determines the review conclusion and the anonymous identity data of the reviewing party in response to the review request acquired from the review organization party, which implements that the true identity information of the reviewing party is not disclosed in the review process, such that the to-be-reviewed party cannot affect the review conclusion by contacting the reviewing party. Moreover, the review conclusion and the anonymous identity data of the reviewing party that are determined by the reviewing party are chained and stored, thereby further preventing the review conclusion from being tampered with, and improving the security and public credibility of the review process while ensuring the security of the review conclusion.

Second Embodiment

Figure 2:
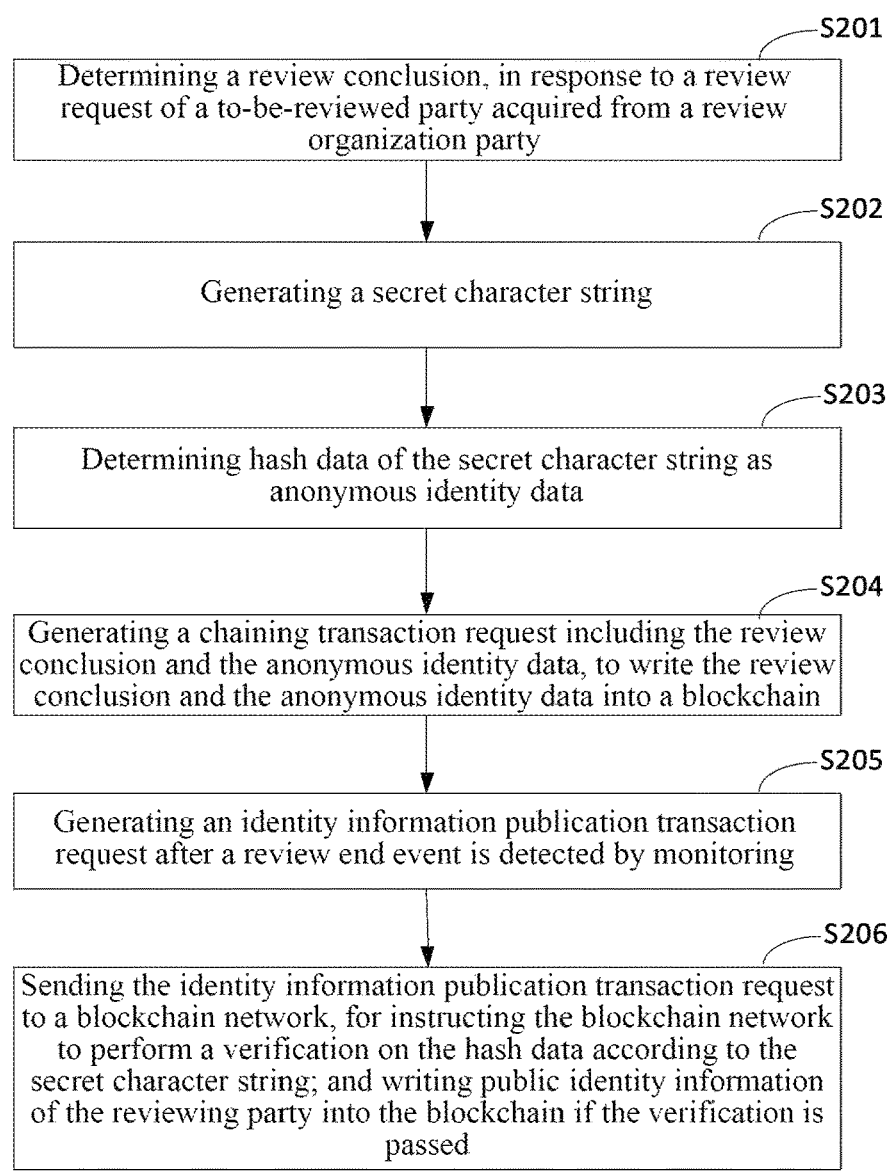
FIG. 2 is a flowchart of a method for performing a review based on a blockchain provided according to a second embodiment of the present disclosure.

FIG. 2 is a flowchart of a method for performing a review based on a blockchain provided according to a second embodiment of the present disclosure. In the embodiments, optimization is performed on the basis of the above embodiment, and specifically a detailed description for how to determine the review conclusion and the anonymous identity data of the reviewing party and when to disclose the true identity information of the reviewing party is given. As shown in FIG. 2, the method for performing a review based on a blockchain provided in this embodiment may include steps S201 to S206.

S201 includes determining a review conclusion, in response to a review request of a to-be-reviewed party acquired from a review organization party.

S202 includes generating a secret character string.

Alternatively, after determining the review conclusion of the review in response to the review request, the reviewing party may generate a group of secret character strings based on a set random algorithm, or may invoke a relevant program code generating a random number and being in a smart contract to generate a group of secret character strings. Here, the relevant program code generating the random number and being in the smart contract may be a method and rule for specifying how to generate the random number, which may be generated based on a consensus mechanism and a set random algorithm.

S203 includes determining hash data of the secret character string as anonymous identity data.

Alternatively, in this embodiment, a hash operation may be performed on the secret character string generated in S202, and the obtained hash result (i.e., the hash data) may be used as the anonymous identity data of the reviewing party.

S204 includes generating a chaining transaction request including the review conclusion and the anonymous identity data, to write the review conclusion and the anonymous identity data into the blockchain.

S205 includes generating an identity information publication transaction request after a review end event is detected by monitoring.

Here, the review end event may refer to that the review conclusion is already written into the blockchain and no review objection is received within a preset time period after the review conclusion is disclosed, which indicates that the review process is ended, that is, the review end event is triggered and generated.

Alternatively, after detecting the review end event, the reviewing party invokes the smart contract to generate an identity information publication request including the true identity information of the reviewing party based on the true identity information of the reviewing party that is to be published. Alternatively, in order to facilitate verifying that the identity information included in the identity information publication transaction request is the chained and stored information of the reviewing party corresponding to the anonymous identity data, and in order to ensure the truth and reliability of the chained and stored data, generating by the reviewing part the identity information publication transaction request, may include: generating an identity information publication transaction request including the secret character string.

Specifically, the reviewing party may invoke the smart contract according to the true identity information of the reviewing party and the secret character string generated in S202, to generate the identity information publication request including the true identity information of the reviewing party and the secret character string.

S206 includes sending the identity information publication transaction request to a blockchain network, for instructing the blockchain network to perform a verification on the hash data according to the secret character string; and writing public identity information of the reviewing party into the blockchain if the verification is passed.

Alternatively, after generating the identity information publication transaction request including the true identity information of the reviewing party and the secret character string, the reviewing party sends the identity information publication transaction request to the blockchain network. After receiving the identity information publication transaction request, a block generation node in a blockchain network may first acquire the included secret character string from the identity information publication transaction request, then perform a hash calculation on the secret character string to obtain a hash result, and perform a consistency comparison between the hash result and the anonymous identity data of the reviewing party that is stored into the blockchain in S204. If the hash result and the anonymous identity data are consistent, it indicates that the verification performed on the hash data according to the secret character string is passed, and thus, the public identity information of the reviewing party may be written into the blockchain.

According to the technical solution in the embodiment of the present disclosure, the reviewing party obtains the review conclusion in response to the review request. When the anonymous identity data of the reviewing party is determined, the anonymous identity data is obtained by generating the secret character string and performing the hash operation on the secret character string. The review conclusion and the anonymous identity data are chained and stored, which ensures the confidentiality and non-tamperability of the review conclusion, which implements that the true identity information of the reviewing party is not disclosed in the review process, and the reviewing party sends the identity information publication transaction request to the blockchain network only after the review end event is detected, which avoids the situation where since the identity of the reviewing party is disclosed too early, the to-be-reviewed party affects the review conclusion by contacting the reviewing party. Moreover, when chaining and storing the public identity information of the reviewing party, the block generation node may chain and store the public identity information of the reviewing party only after the verification on the anonymous identity data of the reviewing party is passed, which ensures that the public identity information and the anonymous identity data correspond to the same reviewing party, thereby further ensuring the accuracy of the public identity information of the reviewing party that is chained and stored.

Third Embodiment

Figure 3:
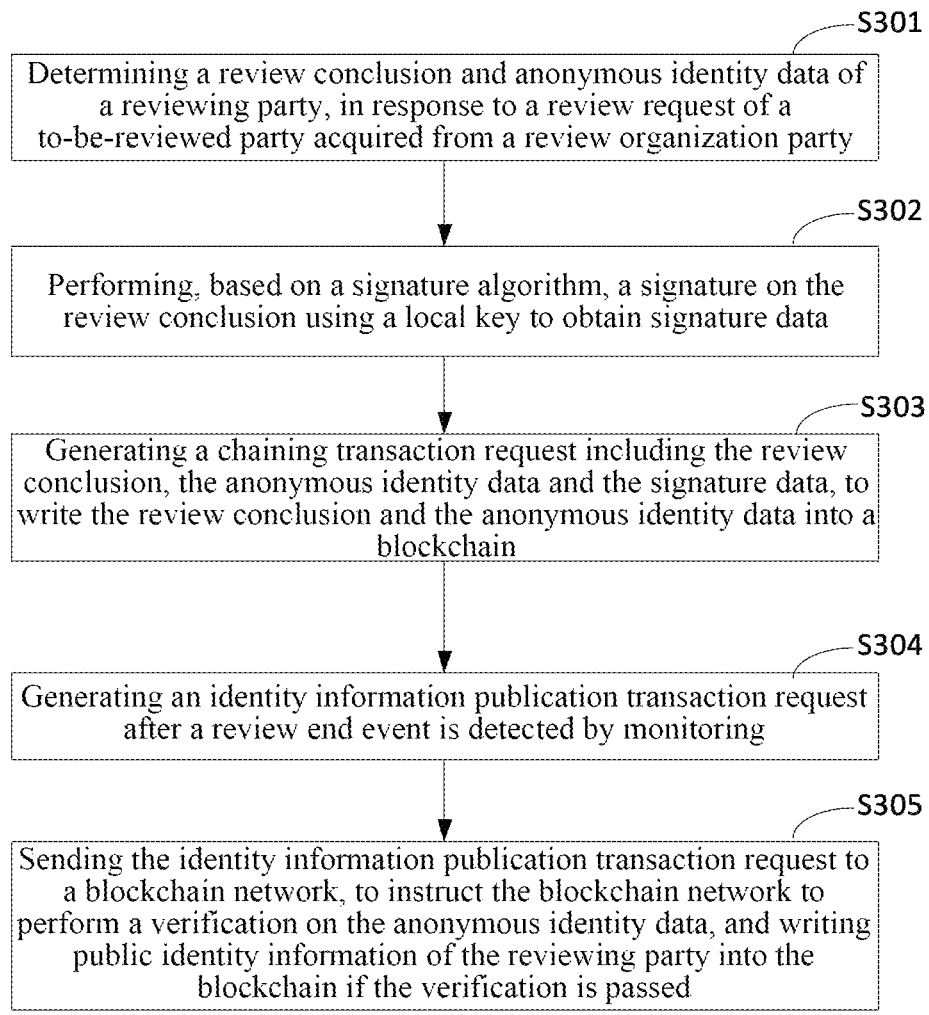
FIG. 3 is a flowchart of a method for performing a review based on a blockchain provided according to a third embodiment of the present disclosure.

FIG. 3 is a flowchart of a method for performing a review based on a blockchain provided according to a third embodiment of the present disclosure. In this embodiments, optimization is performed on the basis of the above embodiments, and specifically a description for how to generate the chaining transaction request including the review conclusion and the anonymous identity data is given. As shown in FIG. 3, the method for performing a review based on a blockchain provided in this embodiment may include: steps S301 to S305.

S301 includes determining a review conclusion and anonymous identity data of a reviewing party, in response to a review request of a to-be-reviewed party acquired from a review organization party.

S302 includes performing, based on a signature algorithm, a signature on the review conclusion using a local key to obtain signature data.

Here, the signature data is used to determine whether the reviewing party belongs to a candidate reviewing party set.

Alternatively, in the embodiment of the present disclosure, the process in which the reviewing party performs, based on the signature algorithm, the signature on the review conclusion using the local key may refer to that the reviewing party invokes the signature algorithm to perform a private key signature on the review conclusion using a local private key to obtain the signature data. In order to more conveniently determine whether the reviewing party belongs to the candidate reviewing party set, in the embodiment of the present disclosure, a ring signature algorithm may alternatively be used to generate a ring signature corresponding to a candidate reviewing party as the signature data. Specifically, each reviewing party in the candidate reviewing party set has a pair of public and private keys of a block account, and already discloses its public key. A reviewing party may invoke the ring signature algorithm, to generate the ring signature of the review conclusion, in combination with the review conclusion, the private key of the reviewing party, and the public key of each candidate reviewing party in the candidate reviewing party set.

S303 includes generating an chaining transaction request including the review conclusion, the anonymous identity data and the signature data, to write the review conclusion and the anonymous identity data into the blockchain.

Alternatively, in combination with the review conclusion, the anonymous identity data and the signature data, the reviewing party may invoke the smart contract to generate the chaining transaction request including the review conclusion, the anonymous identity data and the signature data, so as to request a blockchain node to write the review conclusion and the anonymous identity data into the blockchain. Since the chaining transaction request in this embodiment includes the signature data, the block generation node may determine, based on the signature data, whether the reviewing party sending the chaining transaction request belongs to the candidate reviewing party set, after receiving the chaining transaction request. If the reviewing party belongs to the candidate reviewing party set, the review conclusion and the anonymous identity data may be written into the blockchain. If the reviewing party does not belong to the candidate reviewing party set, the review conclusion is shielded, and the chaining operation is not performed on the review conclusion and the anonymous identity data.

Specifically, if the signature data is a private key signature for the review conclusion, the process of determining whether the reviewing party sending the chaining transaction request belongs to the candidate reviewing party set based on the signature data may include: decrypting the signature data using the public key of each reviewing party in the candidate reviewing party set, and if there is a public key that may decrypt the signature data, it is determined that the reviewing party belongs to the candidate reviewing party set. If the signature data is a ring signature for the review conclusion, a ring signature verification algorithm may be invoked, and may be run by using the ring signature for the review conclusion and the review conclusion as input data, and thus, the determination result of whether the reviewing party corresponding to the review result belongs to the candidate reviewing party set may be outputted.

Alternatively, the operation of determining, based on the signature data, whether the reviewing party sending the chaining transaction request belongs to the candidate reviewing party set may be performed by the block generation node itself, or may be performed by the block generation node by controlling the reviewing party, which is not limited in this embodiment.

S304 includes generating an identity information publication transaction request after a review end event is detected by monitoring.

S305 includes sending the identity information publication transaction request to a blockchain network, to instruct the blockchain network to perform a verification on the anonymous identity data, and writing public identity information of the reviewing party into the blockchain if the verification is passed.

According to the technical solution of the embodiment of the present disclosure, after determining the review conclusion and the anonymous identity data in response to the review request, the reviewing party performs the signature on the review conclusion, and generates the chaining transaction request including the signature data, the review conclusion and the anonymous identity data. The signature data may be used to verify whether the reviewing party belongs to the candidate reviewing party set. The blockchain network may perform the chaining operation on the review conclusion and the anonymous identity data, only after verifying that the reviewing party belongs to the candidate reviewing party set, which prevents a malicious node from impersonating the reviewing party to upload a false review conclusion to the blockchain. Only after the review end event is detected, the reviewing party sends the identity information publication transaction request to the blockchain network to disclose the true identity of the reviewing party. Thus, the accuracy of the chained and stored review conclusion and the security and reliability of the review process are greatly ensured.

Fourth Embodiment

Figure 4:
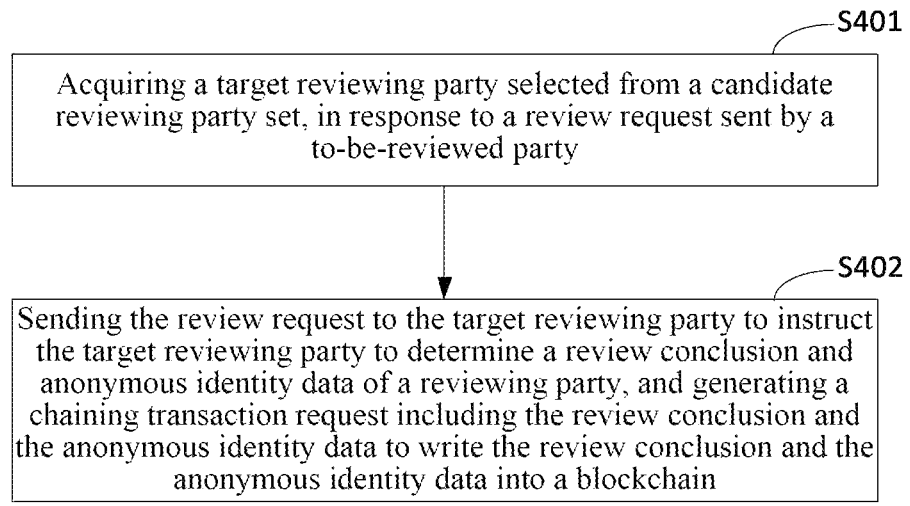
FIG. 4 is a flowchart of a method for performing a review based on a blockchain provided according to a fourth embodiment of the present disclosure.

FIG. 4 is a flowchart of a method for performing a review based on a blockchain provided according to a fourth embodiment of the present disclosure. This embodiment is applicable to a situation where a review is performed on relevant content based on a blockchain. For example, the review may be a review performed on the quality of a paper based on the blockchain. The method may be performed by a review organization party. Specifically, the method may be performed by an apparatus for performing a review based on a blockchain, the apparatus being integrated in a device of the review organization party. The apparatus may be implemented by means of software and/or hardware. As shown in FIG. 4, the method for performing a review based on a blockchain provided in this embodiment may include steps S401 and S402.

S401 includes acquiring a target reviewing party selected from a candidate reviewing party set, in response to a review request sent by a to-be-reviewed party.

Alternatively, in the embodiment of the present disclosure, after receiving the review request sent by the to-be-reviewed party, the review organization party may select at least one target reviewing party performing the review operation from the candidate reviewing party set, according to the to-be-reviewed content in the review request. For example, if the review request received by the review organization party is to review an economic paper, the review organization party may select an economics teacher from the candidate reviewing party set as the target reviewing party.

It should be noted that the process in which the review organization party selects the target reviewing party from the candidate reviewing party set is confidential, and the to-be-reviewed party cannot acquire the target reviewing party selected by the review organization party.

S402 includes sending the review request to the target reviewing party to instruct the target reviewing party to determine a review conclusion and anonymous identity data of the reviewing party, and generating a chaining transaction request including the review conclusion and the anonymous identity data to write the review conclusion and the anonymous identity data into the blockchain.

Alternatively, after determining the target reviewing party, the review organization party may forward the received review request sent by the to-be-reviewed party to each target reviewing party to instruct the target reviewing party to determine the review conclusion and the anonymous identity data of the reviewing party, generate the chaining transaction request, and chain and store the determined review conclusion and the determined anonymous identity data, in response to the review request. The specific operation of each target reviewing party is described in detail in above embodiments, and thus will not be repeatedly described in this embodiment.

Alternatively, in order to prevent a malicious node from impersonating the reviewing party to upload a false review conclusion, the chaining transaction request generated by the reviewing party further includes signature data obtained by performing a signature on the review conclusion. Alternatively, the signature data may be private key signature data obtained by performing a private key signature on the review conclusion, or may be ring signature data of the review conclusion that is generated based on a ring signature algorithm. Whether the target reviewing party sending the chaining transaction request belongs to the candidate reviewing party set may be quickly determined through the ring signature data.

Correspondingly, after sending the review request to the target reviewing party, the review organization party may further: determine whether the target reviewing party belongs to the candidate reviewing party set according to the signature data; if the target reviewing party belongs to the candidate reviewing party set, send review valid notification information to a blockchain network for instructing the blockchain network to write the review conclusion and the anonymous identity data into the blockchain; and if the target reviewing party does not belong to the candidate reviewing party set, send review invalid notification information to the blockchain network for instructing the blockchain network to shield the review conclusion. Specifically, after the review organization party sends the review request to the target reviewing party, the target reviewing party determines, in response to the review request, the review conclusion, the anonymous identity data and the signature data, generates the chaining transaction request including the review conclusion, the anonymous identity data and the signature data, and sends the chaining transaction request to the blockchain network. After receiving the chaining transaction request, the block generation node may send the signature data included in the chaining transaction request to the review organization party, and the review organization party determines whether the target reviewing party belongs to the candidate reviewing party set according to the signature data. The specific determination process is already described in detail in above embodiments, and thus will not be repeatedly described in this embodiment. If it is determined through the determination that the target reviewing party belongs to the candidate reviewing party set, the review organization sends a review valid notification message to the blockchain network, and the block generation node can write the review conclusion and the anonymous identity data into the blockchain only after receiving the review valid notification message. If it is determined through the determination that the target reviewing party does not belong to the candidate reviewing party set, the review organization sends a review invalid notification message to the blockchain network, and the block generation node shields the review conclusion after receiving the review invalid notification message, and does not write the review conclusion and the anonymous identity data into the blockchain any more.

According to the technical solution in the embodiment of the present disclosure, the review organization party selects the target reviewing party from the candidate reviewing party set in response to the review request of the to-be-reviewed party, and sends the review request to the target reviewing party. The reviewing party determines the review conclusion and the anonymous identity data of the reviewing party in response to the review request. The true identity information of the reviewing party is not disclosed in the review process, and it is determined that the target reviewing party is determined by the review organization party, such that the to-be-reviewed party cannot know the information of the target reviewing party, and thus cannot affect the review conclusion by contacting the target reviewing party. Moreover, the review conclusion and the anonymous identity data of the reviewing party that are determined by the reviewing party are chained and stored, thereby further preventing the review conclusion from being tampered with, and improving the security and public credibility of the review process while ensuring the security of the review conclusion.

Fifth Embodiment

Figure 5:
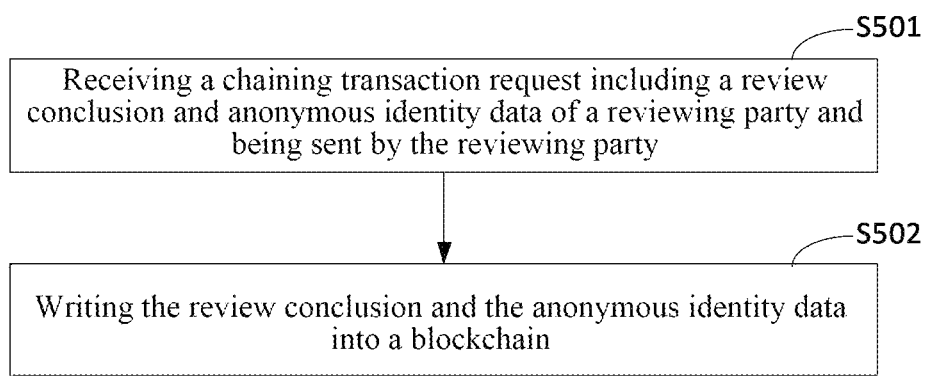
FIG. 5 is a flowchart of a method for performing a review based on a blockchain provided according to a fifth embodiment of the present disclosure.

FIG. 5 is a flowchart of a method for performing a review based on a blockchain provided according to a fifth embodiment of the present disclosure. This embodiment is applicable to a situation where a review is performed on relevant content based on a blockchain. For example, the review may be a review performed on the quality of a paper based on the blockchain. The method may be performed by a block generation node in a blockchain network.

Specifically, the method may be performed by an apparatus for performing a review based on a blockchain, the apparatus being integrated in a device of the block generation node. The apparatus may be implemented by means of software and/or hardware. As shown in FIG. 5, the method for performing a review based on a blockchain provided in this embodiment may include steps S501 and S502.

S501 includes receiving a chaining transaction request including a review conclusion and anonymous identity data of a reviewing party and being sent by the reviewing party.

Alternatively, the anonymous identity data included in the chaining transaction request may be hash data of a secret character string.

S502 includes writing the review conclusion and the anonymous identity data into the blockchain.

Alternatively, after receiving the chaining transaction request, the block generation node analyzes the chaining transaction request to acquire the review conclusion and the anonymous identity data of the reviewing party that are included in the chaining transaction request, and writes the review conclusion and the anonymous identity data into the blockchain.

Alternatively, in consideration of the traceability of the true identity information of the reviewing party after the review is ended, after writing the review conclusion and the anonymous identity data into the blockchain, the block generation node further: performs a verification on the anonymous identity data in response to an identity information publication transaction request sent by the reviewing party; and writes public identity information of the reviewing party into the blockchain if the verification is passed. Specifically, the block generation node may perform a verification on the hash data (i.e., the anonymous identity data included in the chaining transaction request) according to the secret character string in response to an identity information publication transaction request including the secret character string and being sent by the reviewing party, and write the public identity information of the reviewing party into the blockchain if the verification is passed. How to specifically perform the verification on the anonymous identity data is already described in above embodiments, and thus will not be repeatedly described in this embodiment.

Alternatively, in order to prevent a malicious node from impersonating the reviewing party to upload a false review conclusion, the chaining transaction request further includes signature data obtained by performing a signature on the review conclusion. Correspondingly, the writing the review conclusion and the anonymous identity data into a blockchain includes: controlling a review organization party to determine whether a target reviewing party belongs to a candidate reviewing party set according to the signature data; if review valid notification information sent by the review organization party is received, writing the review conclusion and the anonymous identity data into the blockchain; and if review invalid notification information sent by the review organization party is received, shielding the review conclusion and not writing the review conclusion and the anonymous identity data into the blockchain.

It should be noted that, in the embodiment of the present disclosure, the block generation node may alternatively determine whether the target reviewing party belongs to the candidate reviewing party set without controlling the review organization party. The block generation node itself determines whether the target reviewing party belongs to the candidate reviewing party set according to the signature data, and write the review conclusion and the anonymous identity data into the blockchain if it is determined that the target reviewing party belongs to the candidate reviewing party set. Here, the specific process in which the block generation node determines whether the target reviewing party belongs to the candidate reviewing party set is similar to the process of how the review organization party determines whether the target reviewing party belongs to the candidate reviewing party set, and thus will not be repeatedly described in this embodiment.

According to the technical solution in the embodiment of the present disclosure, the block generation node receives the chaining transaction request sent by the reviewing party, and chains and stores the review conclusion and the anonymous identity data included therein. In the review process, only the review conclusion is disclosed, and the true identity information of the reviewing party is not disclosed, such that the to-be-reviewed party cannot affect the review conclusion by contacting the reviewing party. Moreover, the review conclusion and the anonymous identity data of the reviewing party that are determined by the reviewing party are chained and stored, thereby further preventing the review conclusion from being tampered with, and improving the security and public credibility of the review process while ensuring the security of the review conclusion.

Sixth Embodiment

Figure 6:
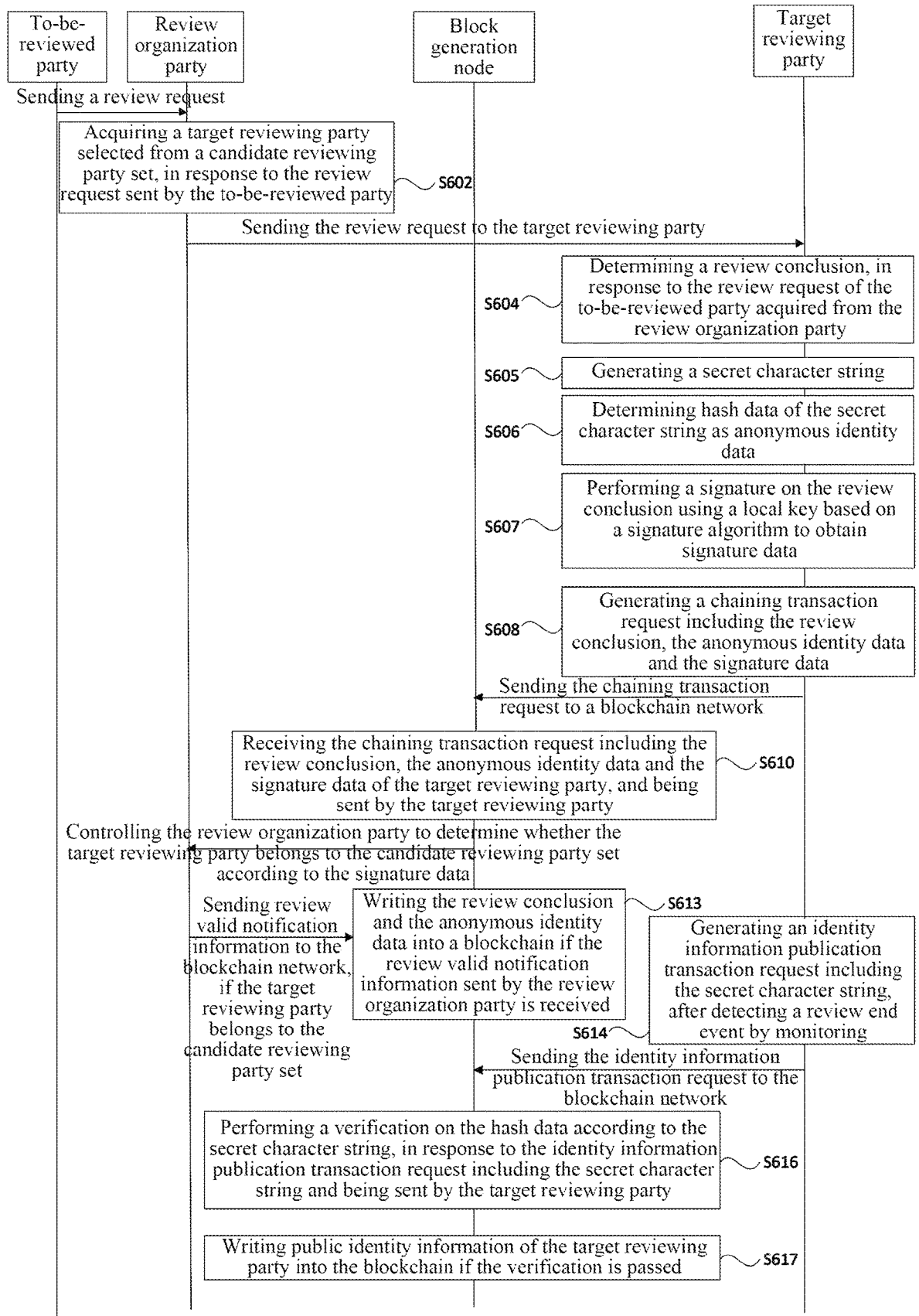
FIG. 6 is a signaling diagram of a method for performing a review based on a blockchain provided according to a sixth embodiment of the present disclosure.

FIG. 6 is a signaling diagram of a method for performing a review based on a blockchain provided according to a sixth embodiment of the present disclosure. On the basis of the above embodiment, this embodiment specifically gives a preferred instance of how the to-be-reviewed party, the review organization party, the target reviewing party, and the block generation node in the blockchain network are interacted to complete the method for performing a review based on a blockchain. As shown in FIG. 6, the method for performing a review based on a blockchain provided in this embodiment may include steps S601 to S617.

S601 includes sending, by a to-be-reviewed party, a review request to a review organization party.

S602 includes acquiring, by a review organization party, a target reviewing party selected from a candidate reviewing party set, in response to the review request sent by the to-be-reviewed party.

S603 includes sending, by the review organization party, the review request to the target reviewing party.

S604 includes determining, by the target reviewing party, a review conclusion, in response to the review request of the to-be-reviewed party acquired from the review organization party.

S605 includes generating, by the target reviewing party, a secret character string.

S606 includes determining, by the target reviewing party, hash data of the secret character string as anonymous identity data.

S607 includes performing, by the target reviewing party, a signature on the review conclusion using a local key based on a signature algorithm to obtain signature data.

S608 includes generating, by the target reviewing party, a chaining transaction request including the review conclusion, the anonymous identity data and the signature data.

S609 includes sending, by the target reviewing party, the chaining transaction request to a blockchain network.

S610 includes receiving, by a block generation node, the chaining transaction request including the review conclusion, the anonymous identity data of the target reviewing party and the signature data and being sent by the target reviewing party.

S611 includes controlling, by the block generation node, the review organization party to determine whether the target reviewing party belongs to the candidate reviewing party set according to the signature data.

S612 includes sending, by the review organization party, review valid notification information to the blockchain network, if the target reviewing party belongs to the candidate reviewing party set.

Alternatively, if the review organization party determines that the target reviewing party does not belong to the candidate reviewing party set, the review organization party sends review invalid notification information to the blockchain network.

S613 includes writing, by the block generation node, the review conclusion and the anonymous identity data into a blockchain if the block generation node receives the review valid notification information sent by the review organization party. Alternatively, the to-be-reviewed party may find, from the blockchain network, the chained and stored review conclusion.

Alternatively, if the block generation node receives the review invalid notification information sent by the review organization party, the block generation node shields the review conclusion and does not write the review conclusion and the anonymous identity data into the blockchain.

S614 includes generating, by the target reviewing party, an identity information publication transaction request including the secret character string, after detecting a review end event by monitoring.

S615 includes sending, by the target reviewing party, the identity information publication transaction request to the blockchain network.

S616 includes performing, by the block generation node, a verification on the hash data according to the secret character string, in response to the identity information publication transaction request including the secret character string and being sent by the target reviewing party.

S617 includes writing, by the block generation node, public identity information of the target reviewing party into the blockchain if the verification is passed.

According to the technical solution in the embodiment of the present disclosure, the to-be-reviewed party generates the review request, and sends the review request to the review organization party. The review organization party determines the target reviewing party performing the review, and sends the review request to the target reviewing party. After determining the review conclusion and the anonymous identity data in response to the review request, the reviewing party performs the signature on the review conclusion, and generates the chaining transaction request including the signature data, the review conclusion and the anonymous identity data. Only after receiving the chaining transaction request and verifying that the reviewing party belongs to the candidate reviewing party set based on the signature data included in the chaining transaction request, the block generation node in the blockchain network may perform the chaining operation on the review conclusion and the anonymous identity data, which prevents a malicious node from impersonating the reviewing party to chain a false review conclusion, which implements that the true identity information of the reviewing party is not disclosed in the review process, and the reviewing party sends the identity information publication transaction request to the blockchain network only after the review end event is detected, which avoids the situation where since the identity of the reviewing party is disclosed too early, the to-be-reviewed party affects the review conclusion by contacting the reviewing party. Moreover, when storing the public identity information of the reviewing party in the chaining mode, the block generation node may chain and store the public identity information of the reviewing party only after the verification on the anonymous identity data of the reviewing party is passed, which ensures that the public identity information and the anonymous identity data correspond to the same reviewing party, thereby further ensuring the accuracy of the public identity information of the chained and stored reviewing party.

Seventh Embodiment

Figure 7:
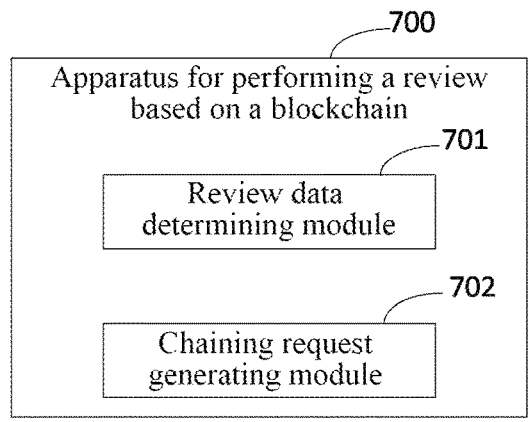
FIG. 7 is a schematic structural diagram of an apparatus for performing a review based on a blockchain provided according to a seventh embodiment of the present disclosure.

FIG. 7 is a schematic structural diagram of an apparatus for performing a review based on a blockchain provided according to a seventh embodiment of the present disclosure. The apparatus for performing a review based on a blockchain may perform the method for performing a review based on a blockchain provided in any one of the first to third embodiments and the sixth embodiment of the present disclosure, and possess functional modules for performing the method and corresponding beneficial effects.

Alternatively, the apparatus may be implemented by means of software and/or hardware, and may be integrated in a device of a reviewing party. As shown in FIG. 7, the apparatus 700 for performing a review based on a blockchain may include:

a review data determining module 701, configured to determine a review conclusion and anonymous identity data of a reviewing party, in response to a review request of a to-be-reviewed party acquired from a review organization party; and a chaining request generating module 702, configured to generate a chaining transaction request including the review conclusion and the anonymous identity data, to write the review conclusion and the anonymous identity data into a blockchain.

According to the technical solution provided in the embodiment of the present disclosure, the reviewing party determines the review conclusion and the anonymous identity data of the reviewing party in response to the review request acquired from the review organization party, which implements that the true identity information of the reviewing party is not disclosed in the review process, such that the to-be-reviewed party cannot affect the review conclusion by contacting the reviewing party. Moreover, the review conclusion and the anonymous identity data of the reviewing party that are determined by the reviewing party are chained and stored, thereby further preventing the review conclusion from being tampered with, and improving the security and public credibility of the review process while ensuring the security of the review conclusion.

Further, the above apparatus further includes:

an identity publishing module, configured to generate an identity information publication transaction request after detecting a review end event by monitoring; and a request sending module, configured to send the identity information publication transaction request to a blockchain network, to instruct the blockchain network to perform a verification on the anonymous identity data; and write public identity information of the reviewing party into the blockchain if the verification is passed.

Further, the review data determining module 701 is specifically configured to:

determine the review conclusion;

generate a secret character string; and determine hash data of the secret character string as the anonymous identity data.

Further, the identity publishing module is specifically configured to:

generate an identity information publication transaction request including the secret character string, for instructing the blockchain network to perform a verification on the hash data according to the secret character string; and write the public identity information of the reviewing party into the blockchain if the verification is passed.

Further, the review data determining module 701 is further specifically configured to:

perform, based on a signature algorithm, a signature on the review conclusion using a local key to obtain signature data; and generate a chaining transaction request including the review conclusion, the anonymous identity data and the signature data, the signature data being used to determine whether the reviewing party belongs to a candidate reviewing party set.

Eighth Embodiment

Figure 8:
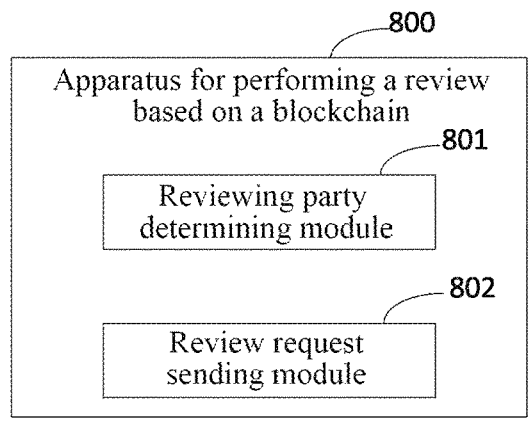
FIG. 8 is a schematic structural diagram of an apparatus for performing a review based on a blockchain provided according to an eighth embodiment of the present disclosure.

FIG. 8 is a schematic structural diagram of an apparatus for performing a review based on a blockchain provided according to an eighth embodiment of the present disclosure. The apparatus for performing a review based on a blockchain may perform the method for performing a review based on a blockchain provided in any one of the fourth embodiment and the sixth embodiment of the present disclosure, and possess functional modules for performing the method and corresponding beneficial effects.

Alternatively, the apparatus may be implemented by means of software and/or hardware, and may be integrated in a device of a review organization party. As shown in FIG. 8, the apparatus 800 for performing a review based on a blockchain may include:

a reviewing party determining module 801, configured to acquire a target reviewing party selected from a candidate reviewing party set, in response to a review request sent by a to-be-reviewed party; and a review request sending module 802, configured to send the review request to the target reviewing party to instruct the target reviewing party to determine a review conclusion and anonymous identity data of a reviewing party; and generate a chaining transaction request including the review conclusion and the anonymous identity data to write the review conclusion and the anonymous identity data into the blockchain.

According to the technical solution in the embodiment of the present disclosure, the review organization party selects the target reviewing party from the candidate reviewing party set in response to the review request of the to-be-reviewed party, and sends the review request to the target reviewing party. The reviewing party determines the review conclusion and the anonymous identity data of the reviewing party in response to the review request. The true identity information of the reviewing party is not disclosed in the review process, and it is determined that the target reviewing party is determined by the review organization party, such that the to-be-reviewed party cannot know the information of the target reviewing party, and thus cannot affect the review conclusion by contacting the target reviewing party. Moreover, the review conclusion and the anonymous identity data of the reviewing party that are determined by the reviewing party are chained and stored, thereby further preventing the review conclusion from being tampered with, and improving the security and public credibility of the review process while ensuring the security of the review conclusion.

Further, the chaining transaction request further includes signature data obtained by performing a signature on the review conclusion.

Correspondingly, the apparatus further includes a signature verifying module, specifically configured to:

determine whether the target reviewing party belongs to the candidate reviewing party set according to the signature data; and if the target reviewing party belongs to the candidate reviewing party set, send review valid notification information to a blockchain network, for instructing the blockchain network to write the review conclusion and the anonymous identity data into the blockchain.

Ninth Embodiment

Figure 9:
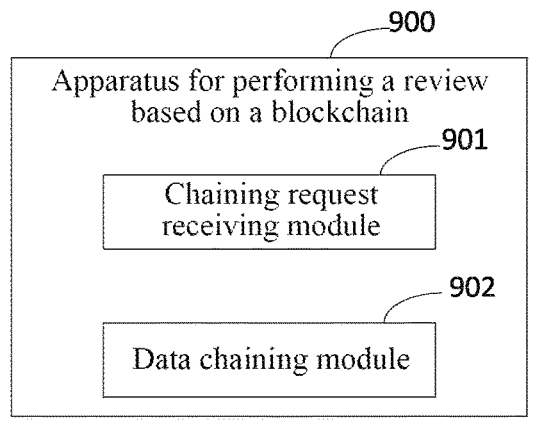
FIG. 9 is a schematic structural diagram of an apparatus for performing a review based on a blockchain provided according to a ninth embodiment of the present disclosure.

FIG. 9 is a schematic structural diagram of an apparatus for performing a review based on a blockchain provided according to a ninth embodiment of the present disclosure. The apparatus for performing a review based on a blockchain may perform the method for performing a review based on a blockchain provided in any one of the fifth embodiment and the sixth embodiment of the present disclosure, and possess functional modules for performing the method and corresponding beneficial effects.

Alternatively, the apparatus may be implemented by means of software and/or hardware, and may be integrated in a device of a block generation node in a blockchain network. As shown in FIG. 9, the apparatus 900 for performing a review based on a blockchain may include:

a chaining request receiving module 901, configured to receive a chaining transaction request including a review conclusion and anonymous identity data of a reviewing party and being sent by the reviewing party; and a data chaining module 902, configured to write the review conclusion and the anonymous identity data into the blockchain.

According to the technical solution in the embodiment of the present disclosure, the block generation node receives the chaining transaction request sent by the reviewing party, and chains and stores the review conclusion and the anonymous identity data included therein. In the review process, only the review conclusion is disclosed, and the true identity information of the reviewing party is not disclosed, such that the to-be-reviewed party cannot affect the review conclusion by contacting the reviewing party. Moreover, the review conclusion and the anonymous identity data of the reviewing party that are determined by the reviewing party are chained and stored, thereby further preventing the review conclusion from being tampered with, and improving the security and public credibility of the review process while ensuring the security of the review conclusion.

Further, the apparatus further includes:

an identity request processing module, configured to perform a verification on the anonymous identity data in response to an identity information publication transaction request sent by the reviewing party.

The data chaining module 902 is further configured to write public identity information of the reviewing party into the blockchain if the verification is passed.

Further, the anonymous identity data is hash data of a secret character string.

Further, the identity request processing module is specifically configured to:

perform a verification on the hash data according to the secret character string in response to an identity information publication transaction request including the secret character string and being sent by the reviewing party.

Further, the chaining transaction request further includes signature data obtained by performing a signature on the review conclusion.

Correspondingly, when writing the review conclusion and the anonymous identity data into the blockchain, the data chaining module 902 is specifically configured to:

control the review organization party to determine whether a target reviewing party belongs to a candidate reviewing party set according to the signature data; and if review valid notification information sent by the review organization party is received, write the review conclusion and the anonymous identity data into the blockchain.

Tenth Embodiment

According to embodiments of the present disclosure, the present disclosure further provides an electronic device and a readable storage medium.

Figure 10:
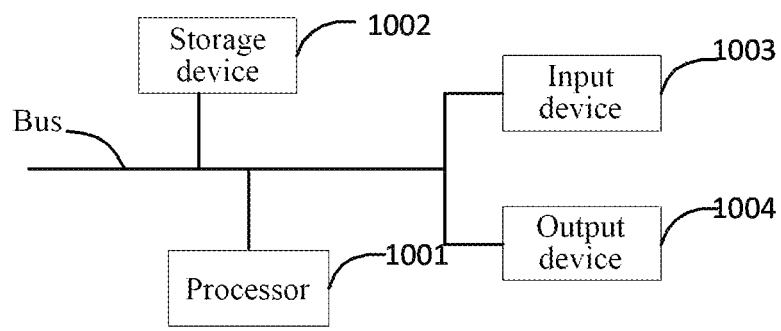
FIG. 10 is a block diagram of an electronic device adapted to implement a method for performing a review based on a blockchain according to embodiments of the present disclosure.

As shown in FIG. 10, FIG. 10 is a block diagram of an electronic device of a method for performing a review based on a blockchain according to embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile devices such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 10, the electronic device includes one or more processors 1001, a memory 1002, and an interface for connecting components, including a high speed interface and a low speed interface. The various components are interconnected by different buses and may be mounted on a common motherboard or otherwise as desired. The processor may process instructions executed within the electronic device, including instructions stored in or on a memory to display graphical information of the GUI on an external input/output device, such as a display device coupled to an interface. In other embodiments, multiple processors and/or multiple buses may be used with multiple memories and multiple memories, if desired. Similarly, a plurality of electronic devices may be connected, each providing a portion of the necessary operations (e.g., as a server array, a set of blade servers, or a multiprocessor system). FIG. 10 illustrates a processor 1001 as an example.

The memory 1002 is a non-transitory computer readable storage medium provided in the disclosure. The memory stores instructions executable by at least one processor to cause the at least one processor to perform the method for performing a review based on a blockchain according to some embodiments of the disclosure. The non-transitory computer-readable storage medium of the present disclosure stores computer instructions for causing a computer to perform the method for performing a review based on a blockchain according to some embodiments of the disclosure.

The memory 1002, as a non-transitory computer readable storage medium, may be used to store a non-transitory software program, a non-transitory computer executable program, and a module, such as a program instruction/module corresponding to the method for performing a review based on a blockchain in an embodiment of the present disclosure (for example, the review data determination module 701 and the chaining request generation module 702 shown in FIG. 7; or the review party determination module 801 and the review request sending module 802 shown in FIG. 8; alternatively, the chaining request receiving module 901 and the data chaining module 902 shown in FIG. 9). The processor 1001 executes various functional applications and data processing of the server by running non-transitory software programs, instructions, and modules stored in the memory 1002, that is, implements the method for performing a view based on a blockchain in the above method embodiments.

The memory 1002 may include a storage program area and a storage data area, where the storage program area may store an operating system, an application program required by at least one function; the storage data area may store data or the like created according to the use of the electronic device of the method for performing a review based on a blockchain. In addition, memory 1002 may include high speed random access memory, and may also include non-transitory memory, such as at least one magnetic disk storage device, flash memory device, or other non-transitory solid state storage device. In some embodiments, memory 1002 may optionally include remotely disposed memory relative to processor 1001, which may be connected via a network to an electronic device of the method for performing a review based on a blockchain. Examples of such networks include, but are not limited to, the Internet, enterprise intranets, local area networks, mobile communication networks, and combinations thereof.

The electronic device of the method for performing a review based on a blockchain may further include input device 1003 and output device 1004. The processor 1001, the memory 1002, the input device 1003, and the output device 1004 may be connected via a bus or otherwise, as illustrated in FIG. 10.

The input device 1003 may receive input number or character information, and generate key signal input related to user settings and functional control of an electronic device of the method for performing a review based on a blockchain, such as a touch screen, a keypad, a mouse, a track pad, a touch pad, a pointer bar, one or more mouse buttons, a track ball, a joystick, or the like. The output device 1004 may include a display device, an auxiliary lighting device (e.g., an LED), a tactile feedback device (e.g., a vibration motor), and the like. The display device may include, but is not limited to, a liquid crystal display (LCD), a light emitting diode (LED) display, and a plasma display. In some embodiments, the display device may be a touch screen.

The various embodiments of the systems and techniques described herein may be implemented in digital electronic circuit systems, integrated circuit systems, specific ASICs (application specific integrated circuits), computer hardware, firmware, software, and/or combinations thereof. These various embodiments may include being implemented in one or more computer programs that may be executed and/or interpreted on a programmable system including at least one programmable processor. The at least one programmable processor may be a dedicated or general purpose programmable processor, may receive data and instructions from a memory system, at least one input device, and at least one output device, and transmit the data and instructions to the memory system, the at least one input device, and the at least one output device.

These computing programs (also referred to as programs, software, software applications, or code) include machine instructions of a programmable processor and may be implemented in high-level procedures and/or object-oriented programming languages, and/or assembly/machine languages. As used herein, the terms "machine-readable medium" and "computer-readable medium" refer to any computer program product, device, and/or apparatus (e.g., magnetic disk, optical disk, memory, programmable logic device (PLD)) for providing machine instructions and/or data to a programmable processor, including a machine-readable medium that receives machine instructions as machine-readable signals. The term "machine readable signal" refers to any signal used to provide machine instructions and/or data to a programmable processor.

To provide interaction with a user, the systems and techniques described herein may be implemented on a computer having a display device (e.g., a CRT (cathode ray tube) or LCD (liquid crystal display) monitor) for displaying information to the user; and a keyboard and a pointing device (e.g., a mouse or a trackball) through which a user can provide input to a computer. Other types of devices may also be used to provide interaction with a user; for example, the feedback provided to the user may be any form of sensory feedback (e.g., visual feedback, auditory feedback, or tactile feedback); and input from the user may be received in any form, including acoustic input, speech input, or tactile input.

The systems and techniques described herein may be implemented in a computing system including a background component (e.g., as a data server), or a computing system including a middleware component (e.g., an application server), or a computing system including a front-end component (e.g., a user computer having a graphical user interface or a web browser through which a user may interact with embodiments of the systems and techniques described herein), or a computing system including any combination of such background component, middleware component, or front-end component. The components of the system may be interconnected by any form or medium of digital data communication (e.g., a communication network). Examples of communication networks include local area networks (LANs), wide area networks (WANs), the Internet, and block chain networks.

The computer system may include a client and a server. The client and server are typically remote from each other and typically interact through a communication network. The relationship between the client and the server is generated by computer programs running on the corresponding computer and having a client-server relationship with each other.

According to the technical solution of the embodiment of the present disclosure, in response to the review request obtained from the review organization, the review party determines the review conclusion and the anonymous identity data of the review party, so that in the review process, the true identity information of the review party is not disclosed, so that the to-be-reviewed party cannot influence the review conclusion by contacting the review party, and the review conclusion determined by the review party and the anonymous identity data of the review party are chained and stored, thereby further preventing the review conclusion from being tampered with, and improving the security and public reliability of the review process while ensuring the security of the review conclusion.

It is to be understood that the steps of reordering, adding or deleting may be performed using the various forms shown above. For example, the steps described in the present disclosure may be performed in parallel or sequentially or in a different order, so long as the desired results of the technical solution disclosed in the present disclosure can be realized, and no limitation is imposed herein.

The foregoing detailed description is not intended to limit the scope of the present disclosure. It will be appreciated by those skilled in the art that various modifications, combinations, sub-combinations, and substitutions may be made depending on design requirements and other factors. Any modifications, equivalents, and modifications that fall within the spirit and principles of the disclosure are intended to be included within the scope of this disclosure.

What is claimed is:

1. A method for performing a review based on a blockchain, performed by a reviewing party, the method comprising:
   determining a review conclusion and anonymous identity data of the reviewing party, in response to a review request of a to-be-reviewed party acquired from a review organization party; and
   generating a chaining transaction request comprising the review conclusion and the anonymous identity data, to write the review conclusion and the anonymous identity data into the blockchain;
   wherein the generating a chaining transaction request comprising the review conclusion and the anonymous identity data comprises:
   performing, based on a signature algorithm, a signature on the review conclusion using a local key to obtain signature data; and
   generating the chaining transaction request comprising the review conclusion, the anonymous identity data and the signature data, the signature data being used to determine whether the reviewing party belongs to a candidate reviewing party set.

2. The method according to claim 1, wherein after generating the chaining transaction request comprising the review conclusion and the anonymous identity data, the method further comprises:

generating an identity information publication transaction request after a review end event is detected by monitoring; and sending the identity information publication transaction request to a blockchain network, to instruct the blockchain network to perform a verification on the anonymous identity data, and writing public identity information of the reviewing party into the blockchain in response to determining that the verification is passed.

3. The method according to claim 1, wherein the determining a review conclusion and anonymous identity data of the reviewing party comprises:

determining the review conclusion;

generating a secret character string; and determining hash data of the secret character string as the anonymous identity data.

4. The method according to claim 3, wherein the generating an identity information publication transaction request comprises:

generating an identity information publication transaction request comprising the secret character string, for instructing the blockchain network to perform a verification on the hash data according to the secret character string; and writing the public identity information of the reviewing party into the blockchain in response to determining that the verification is passed.

5. A method for performing a review based on a blockchain, performed by a review organization party, the method comprising:

acquiring a target reviewing party selected from a candidate reviewing party set, in response to a review request sent by a to-be-reviewed party; and sending the review request to the target reviewing party to instruct the target reviewing party to determine a review conclusion and anonymous identity data of the reviewing party, and generating a chaining transaction request comprising the review conclusion and the anonymous identity data to write the review conclusion and the anonymous identity data into the blockchain;

wherein the chaining transaction request further comprises signature data obtained by performing a signature on the review conclusion, and correspondingly, after the sending the review request to the target reviewing party, the method further comprises:

determining whether the target reviewing party belongs to the candidate reviewing party set according to the signature data.

6. The method according to claim 5, wherein after the sending the review request to the target reviewing party, the method further comprises:

in response to determining that the target reviewing party belongs to the candidate reviewing party set, sending review valid notification information to a blockchain network, for instructing the blockchain network to write the review conclusion and the anonymous identity data into the blockchain.

7. A method for performing a review based on a blockchain, performed by a block generation node in a blockchain network, the method comprising:

receiving a chaining transaction request comprising a review conclusion and anonymous identity data of a reviewing party and being sent by the reviewing party; and writing the review conclusion and the anonymous identity data into the blockchain;

wherein the chaining transaction request further comprises signature data obtained by performing a signature on the review conclusion, and correspondingly, the writing the review conclusion and the anonymous identity data into the blockchain comprises:

controlling a review organization party to determine whether the reviewing party belongs to a candidate reviewing party set according to the signature data.

8. The method according to claim 7, wherein after writing the review conclusion and the anonymous identity data into the blockchain, the method further comprises:

performing a verification on the anonymous identity data in response to an identity information publication transaction request sent by the reviewing party; and writing public identity information of the reviewing party into the blockchain in response to determining that the verification is passed.

9. The method according to claim 7, wherein the anonymous identity data is hash data of a secret character string.

10. The method according to claim 9, wherein performing a verification on the anonymous identity data in response to an identity information publication transaction request sent by the reviewing party comprises:

performing a verification on the hash data according to the secret character string, in response to an identity information publication transaction request comprising the secret character string and being sent by the reviewing party.

11. The method according to claim 7, wherein the writing the review conclusion and the anonymous identity data into the blockchain further comprises:

controlling a review organization party to determine whether the target reviewing party belongs to a candidate reviewing party set according to the signature data; and in response to determining that review valid notification information sent by the review organization party is received, writing the review conclusion and the anonymous identity data into the blockchain.

* * * * *